United States Patent Office 3,804,869
Patented Apr. 16, 1974

3,804,869
RUTHENIUM COMPLEXES AND PROCESSES
FOR THEIR PREPARATION
Pierre Chabardes and Louis Colevray, Lyons, France, assignors to Rhone-Poulenc S.A., Paris, France
No Drawing. Continuation of abandoned application Ser. No. 782,769, Dec. 10, 1968. This application May 24, 1972, Ser. No. 256,424
Claims priority, application France, Dec. 11, 1967, 131734
Int. Cl. C07f 15/00
U.S. Cl. 260—429 J          5 Claims

ABSTRACT OF THE DISCLOSURE

The invention provides new ruthenium complexes of the formula:

$$Ru(diket)_2L_n$$

in which (diket) represents a bidentate ligand derived from a β-diketone and has the general formula:

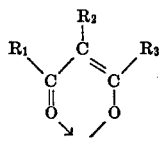

in which $R_1$, $R_2$ and $R_3$ are each alkyl of 1 to 3 carbon atoms, phenyl or naphthyl, or $R_2$ is hydrogen, or $R_1$ and $R_2$ together form a tri- or tetra-methylene chain which is unsubstituted or substituted by alkyl of 1 to 3 carbon atoms, or $R_1$ and $R_3$ together form a di- or tri-methylene chain which is unsubstituted or substituted by an alkyl group of 1 to 3 carbon atoms and L is a nitrile ligand, which are useful as catalysts in, for example, isomerizations (such as the REPPE synthesis), hydrogenations, and dimerizations (such as the hydrodimerization of acrylonitrile to adiponitrile).

CROSS-REFERENCE TO RELATED APPLICATIONS

This is a continuation application of our earlier application Ser. No. 782,769, filed Dec. 10, 1968 and now abandoned.

This invention relates to new ruthenium complexes, containing no halogeno or carbonyl ligands, which contain ligands derived from β-diketones, together with monodentate or polydentate ligands different from the β-diketone ligands. The invention further relates to the preparation of the new complexes.

Numerous ruthenium complexes which contain ligands derived from β-diketones and halogen ligands are known. For example, British patent specification No. 956,242 describes the following chloro complexes: (5,6 - dimethyl-1,10 - phenanthroline)$_2$(acac)RuCl, (4,4'-diethyl-2,2'-bipyridino)$_2$(acac)RuCl, (4,4'-diethyl - 2,2' - bipyridino) (acac)$_2$RuCl.

Two ruthenium complexes, containing ligands derived from β-diketones, which contain no halogeno or carbonyl ligands have been described in the literature (Dwyer et al. Austr. J. Chem., 16, 49 (1963)). These are: (2,2'-bipyridino)(acac)$_2$Ru$^{II}$ and (o-phen)(acac)$_2$Ru$^{II}$ (where "(acac)" and "(o-phen)" are used herein to denote the acetylacetonato and 1,10-phenanthroline ligands, respectively).

According to the present invention, there are provided ruthenium complexes of the general formula:

$$Ru(diket)_2L_n$$

in which (diket) represents a bidentate ligand derived from a β-diketone and has the general formula:

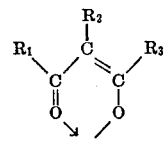

in which $R_1$, $R_2$ and $R_3$ each represent alkyl, cycloalkyl or aryl groups which may be substituted by halogen and wherein $R_1$ and $R_2$ or $R_2$ and $R_3$, taken together, may represent a divalent hydrocarbyl radical which may be substituted by halogen or $R_2$ may be hydrogen; L is a mono- or bi-dentate ligand other than (diket), CO, 2,2'-bipyridino or (o-phen) derived from an organic compound capable of donating one or more pairs of electrons and $n$ is 1 or 2.

Preferred (diket) ligands are those in which $R_1$, $R_2$ and $R_3$ are each lower alkyl, phenyl or naphthyl, or $R_1$ and $R_2$ or $R_2$ and $R_3$ together form a tri- or tetra-methylene chain which may be substituted by lower alkyl.

Examples of the ligand (diket) include:

acetylacetonato,
2,4-hexanedionato,
2,4-heptanedionato,
5-methyl-2,4-hexanedionato,
3,5-heptanedionato,
1,1,1-trifluoro-2-pentanedionato,
benzoylacetonato,
1,3-diphenyl-1,3-propanedionato,
1,1,1-trifluoro-2-benzoylacetonato,
β-isonaphthoyl-1,1,1-trifluoroacetonato,
3-methyl-2,4-pentanedionato,
1,3-cyclopentanedionato,
1,3-cyclohexanedionato,
5,5-dimethyl-1,3-cyclohexanedionato,
2-acetylcyclohexanonato and
1,8-hexahydronaphthalenedionato.

Examples of the ligand L may be taken from organic compounds which are capable of donating one or more pairs of electrons, particularly monoamines or polyamines such as methylamine, ethylamine, cyclohexylamine and ethylenediamine; aldehydes such as formaldehyde, acetaldehyde and benzaldehyde; imines such as acetaldimine; amides such as dimethylformamide and propionamide; nitriles such as propionitrile, acetonitrile and acrylonitrile; tertiary phosphines such as triphenylphosphine; tertiary arsines and stibines; monoolefinic or polyolefinic compounds such as for example cyclooctadienes; and heterocyclic bases such as pyridine.

The complexes of the invention may be prepared by the following processes.

In the first process, the ligand L is reacted, in the presence of a hydrogenation catalyst, with a tris(diket)Ru complex under an atmosphere containing hydrogen.

A solvent may be present and may be, for example, a liquid aliphatic hydrocarbon, such as pentane or hexane, a liquid cycloaliphatic hydrocarbon such as cyclohexane, an aromatic hydrocarbon such as benzene or an ether such as 2-methoxyethane or dioxane. If the ligand L is in the liquid state under the reaction conditions it may be used as solvent.

The hydrogen pressure employed is not critical though a very low pressure will give an uneconomically slow reaction while a very high hydrogen pressure may reduce certain of the ligands employed, for example, when L is nitrile. Preferred hydrogen pressures are from 5 to 100 bars.

The hydrogenation catalyst employed may be any catalyst employed in hydrogenation reactions. However, to avoid introducing metals other than ruthenium into the reaction system (which may form complexes different from those required and may contaminate the required complexes) it is preferred to use a ruthenium catalyst. Hydrated ruthenium oxide $RuO(OH)_2$ has proved a particularly valuable catalyst in this process. The amount of catalyst employed is not critical: it is possible to work with an amount of a ruthenium-containing catalyst equal to 0.001 to 10% by weight of the ruthenium contained in the reagent tris(diket)Ru complex. This amount may be increased to more than 10% but such an amount gives no additional advantage and is uneconomic.

The reaction temperature is not critical and may vary within a wide range, for example from 20° to 150° C., depending on the reagents used.

In the second process the ligand L is introduced into the complex by a ligand exchange process in which complexes of the formula $(diket)_2RuL'_n$ where L' differs from the required ligand L in being a weaker electron donor, are reacted with the required ligand L to give the required complex $(diket)_2RuL_n$.

This exchange process may take place in an inert solvent, for example one of those exemplified in the first process; likewise, if the ligand L is liquid under the reaction conditions it may be employed as solvent.

When working in an inert solvent the amount of $(diket)_2RuL'_n$ and L employed may be close to the stoichiometric quantities or within a slight excess of L; if L is being used as solvent it will be in excess.

The two processes may also be used to prepare the known compounds $(2,2'\text{-bipyridino})(acac)_2Ru^{II}$ and $(o\text{-phen})(acac)_2Ru^{II}$.

The ruthenium complexes of the invention may be employed as catalysts in many organic reactions such as isomerization, oligomerizations, for example the REPPE synthesis, hydrogenations and dimerizations, particularly hydrodimerization of acrylonitrile to adiponitrile.

The following Examples 1 to 5 illustrate the invention:

EXAMPLE 1

10 g. of $Ru(acac)_3$, 0.1 g. of $RuO(OH)_2$, 335 cm³ of anhydrous benzene and 335 cm.³ of acetonitrile were introduced into a one litre autoclave.

The apparatus was purged with nitrogen and hydrogen was then introduced under a pressure of 10 bars. The mixture was heated to 60° C. for 16 hours and cooled; the gas was released from the apparatus, the product filtered and the filtrate concentrated under reduced pressure. 10.57 g. of a solid product of an orange-brown color remained and were extracted in a Soxhlet with diethyl ether. An etherial solution containing 5 g. of unconverted ruthenium acetylacetonate was obtained and 4.39 g. of solid complex of formula $(acac)_2Ru(CH_3CN)_2$ remained in the Soxhlet. The yield, relative to ruthenium acetylacetonate consumed, is 92%.

EXAMPLE 2

0.5 g. of recrystallized $Ru(acac)_3$, 0.005 g. of $RuO(OH)_2$, 25 cm.³ of anhydrous benzene and 25 cm.³ of propionitrile were introduced into a 125 cm.³ autoclave.

The hydrogen pressure was adjusted to 10 bars. The mixture was heated to 90° C. for 16 hours and then cooled, the gas was released from the apparatus, the product filtered, the filtrate evaporated and the residue from the evaporation washed with 50 cm.³ of ether. A solid brown complex of formula $Ru(acac)_2(CH_3\!-\!CH_2\!-\!CN)_2$ was obtained in a yield of 18%.

EXAMPLE 3

0.49 g. of $Ru(acac)_3$, 10 cm.³ of pyridine and 0.005 g. of $RuO(OH)_2$ were introduced into a 125 cm.³ autoclave, followed by hdrogen up to a pressure of 10 bars.

The mixture was heated to 100° C. for 15 hours and then cooled, the gas was released from the apparatus, the product filtered, the filtrate evaporated and the evaporation residue washed with pentane. A brownish-orange complex of formula $Ru(acac)_2(C_5H_5N)_2$ was obtained in a yield of 86%.

EXAMPLE 4

0.3 g. of $Ru(acac)_2(CH_3CN)_2$ and 10 cm.³ of pyridine were introduced into a three-necked 50 cm.³ flask fitted with a stirrer, a condenser and a nitrogen inlet.

The solution was stirred under reflux for 20 hours, then concentrated to dryness, and the solid residue washed with pentane; 0.32 g. of a brownish-orange solid complex of formula $Ru(acac)_2(C_5H_5N)_2$ were thus obtained in a yield of 90%.

EXAMPLE 5

0.38 g. of $Ru(acac)_2(CH_3CN)_2$, 10 cm.³ of ethanol and 0.54 g. of triphenylphosphine were introduced into a three-necked 50 cm.³ flask fitted with a stirrer, a condenser and a nitrogen inlet.

An emulsion was obtained which was heated under reflux for 21 hours. After cooling the mixture was filtered and the residue washed with 40 cm.³ of cyclohexane and then with pentane. A complex of formula $$Ru(acac)_2[(C_6H_5)_3P]_2$$

was obtained in a yield of 48.5%.

The following Examples 6 and 7 illustrate the preparation of known compounds by the process of the invention.

EXAMPLE 6

0.38 g. of $Ru(acac)_2(CH_3CN)_2$, 0.16 g. of $\alpha,\alpha'$-bipyridyl, and 20 cm.³ of ethanol were introduced into a three-necked 50 cm.³ flask fitted with a condenser, a stirrer and a nitrogen inlet.

The mixture was heated under reflux for 22 hours, then cooled, filtered, and the filtrate evaporated. 0.4 g. of a chestnut-black solid were thus obtained and were recrystallized from a mixture of benzene and petroleum ether.

A complex of formula $(2,2'\text{-bipyridino})(acac)_2Ru$ was obtained in a yield of 88%.

EXAMPLE 7

0.38 g. of $Ru(acac)_2(CH_3CN)_2$, 0.19 of 1,10-phenanthroline and 20 cm.³ of methoxyethanol are introduced into a three-necked 50 cm.³ flask fitted with a stirrer, a condenser and a nitrogen inlet.

The mixture is heated to 80° C. for two hours and then evaporated to dryness, and the residue is washed with hexane and then with pentane. 0.44 g. of a brownish-black complex of formula $$(o\text{-phen})(acac)_2Ru$$

were obtained, this figure representing a yield of 93%.

We claim:

1. A ruthenium complex of the formula:

$$Ru(diket)_2L_2$$

in which (diket) is a bidentate ligand and has the formula:

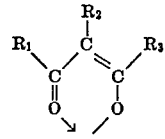

in which $R_1$, $R_2$ and $R_3$ are each methyl, ethyl, n-propyl, isopropyl, phenyl or naphthyl, and $R_2$ can also be hydrogen, or $R_1$ and $R_2$ together form a tri- or tetra-methylene chain which is unsubstituted or substituted by alkyl of 1 to 3 carbon atoms or $R_1$ and $R_3$ together form a di- or tri-methylene chain which is unsubstituted or substituted by methyl, ethyl, n-propyl or isopropyl, and L is a nitrile ligand.

2. A ruthenium complex according to claim 1 in which (diket) is selected from the class consisting of acetylacetonato, 2,4-hexanedionato, 2,4-heptanedionato, 5-methyl-2,4-hexanedionato, 3,5-heptanedionato, benzoylacetonato, 1,3-di-phenyl-1,3-propanedionato, 3-methyl-2,4-pentanedionato, 1,3-cyclopentanedionato, 1,3-cyclohexanedionato, 5,5-dimethy-1,3-cyclohexanedionato and 2-acetyl-cyclohexanonato, and L is selected from the class consisting of acetonitrile, propionitrile, and acrylonitrile.

3. A ruthenium complex according to claim 1 in which the ligand L is selected from propionitrile, acetonitrile and acrylonitrile.

4. The ruthenium complex $Ru(acac)_2(CH_3CN)_2$.

5. The ruthenium complex $Ru(acac)_2(CH_3CH_2CN)_2$.

References Cited

Dwyer, et al.: Aust. J. Chem. 16 (1963), pp. 42–50.

PATRICK P. GARVIN, Primary Examiner

A. P. DEMERS, Assistant Examiner

U.S. Cl. X.R.

252—431 P, 431 N, 431 R, 431 C; 260—370 R, 465.8